(12) United States Patent
Ide

(10) Patent No.: US 10,695,855 B2
(45) Date of Patent: Jun. 30, 2020

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 539 days.

(21) Appl. No.: 15/500,649

(22) PCT Filed: Jul. 30, 2015

(86) PCT No.: PCT/JP2015/071673
§ 371 (c)(1),
(2) Date: Jan. 31, 2017

(87) PCT Pub. No.: WO2016/027638
PCT Pub. Date: Feb. 25, 2016

(65) Prior Publication Data
US 2017/0216952 A1 Aug. 3, 2017

(30) Foreign Application Priority Data

Aug. 18, 2014 (JP) .................................. 2014-165785

(51) Int. Cl.
*B23K 9/073* (2006.01)
*B23K 9/12* (2006.01)

(52) U.S. Cl.
CPC ................ *B23K 9/073* (2013.01); *B23K 9/12* (2013.01); *B23K 9/125* (2013.01)

(58) Field of Classification Search
CPC .......... B23K 9/073; B23K 9/12; B23K 9/125; B23K 9/09; B23K 9/095; B23K 9/124; B23K 9/10

USPC ............... 219/137.71, 130.21, 125.1, 130.31
See application file for complete search history.

(56) References Cited

U.S. PATENT DOCUMENTS

| 3,205,396 | A | 9/1965 | King |
| 8,993,925 | B2 | 3/2015 | Fujiwara et al. |
| 10,376,981 | B2 * | 8/2019 | Tanaka ........................ 219/137.2 |
| 2005/0284854 | A1 | 12/2005 | Tong et al. |

(Continued)

FOREIGN PATENT DOCUMENTS

| CN | 1712169 A | 12/2005 |
| CN | 101274385 A | 10/2008 |

(Continued)

OTHER PUBLICATIONS

Extended European Search Report issued for the European Patent Application No. 15834443.2 dated May 4, 2018.

(Continued)

*Primary Examiner* — Michael G Hoang
*Assistant Examiner* — Bonita Khlok
(74) *Attorney, Agent, or Firm* — Greenblum & Bernstein, P.L.C.

(57) ABSTRACT

There is provided an arc welding control method of alternating a feeding rate of a welding wire between a forward feeding period and a reverse feeding period, controlling a welding voltage based on a voltage setting value and alternating short-circuiting periods and arc periods to perform welding. In the arc welding control method a cycle of the feeding rate is changed based on the voltage setting value.

10 Claims, 6 Drawing Sheets

(56) References Cited

U.S. PATENT DOCUMENTS

| | | |
|---|---|---|
| 2008/0237208 A1 | 10/2008 | Era et al. |
| 2012/0074114 A1* | 3/2012 | Kawamoto .......... B23K 9/0731 219/130.21 |
| 2012/0111842 A1 | 5/2012 | Fujiwara et al. |
| 2012/0145691 A1 | 6/2012 | Fujiwara et al. |
| 2013/0082040 A1 | 4/2013 | Kawamoto et al. |
| 2013/0082041 A1 | 4/2013 | Kawamoto et al. |

FOREIGN PATENT DOCUMENTS

| | | |
|---|---|---|
| CN | 102149501 A | 8/2011 |
| CN | 102361722 A | 2/2012 |
| EP | 2292364 A1 | 3/2011 |
| EP | 2402104 A1 | 1/2012 |
| JP | 09-277044 | 10/1997 |
| JP | 5201266 | 2/2013 |
| WO | 2011/013305 | 2/2011 |

OTHER PUBLICATIONS

Chinese Office Action issued for Chinese Patent Application No. 201580032002.1 dated Aug. 1, 2018 along with the English translation.

International Search Report (ISR) issued in International Patent Application No. PCT/JP2015/071673, dated Oct. 20, 2015; and written opinion with a corresponding English translation.

\* cited by examiner

ARC WELDING CONTROL METHOD

TECHNICAL FIELD

The present invention relates to an arc welding control method of alternating a feeding rate of a welding wire between a forward feeding period and a reverse feeding period, controlling a welding voltage based on a voltage setting value and alternating short-circuiting periods and arc periods to perform welding.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between forward feeding and reverse feeding. According to the invention of a patent document 1, an average value of a feeding rate is adjusted according to a welding current setting value, and a repetition frequency and an amplitude of forward feeding and reverse feeding of a welding wire are adjusted to individual values according to the welding current setting value. In the welding method of alternating feeding of the welding wire between the forward feeding and the reverse feeding, a repetition cycle of short circuit and arc can be set to a desired value despite that such the setting is impossible in the related art of the feeding at a constant feeding rate. Thus a generation amount of spatter can be reduced, and improvement of welding quality such as improvement of bead appearance can be achieved.

PRIOR ART DOCUMENT

Patent Document

Patent Document 1: Japanese Patent No. 5201266 B

SUMMARY OF INVENTION

Problems to be Solved by Invention

A suitable welding voltage value differs depending on a welding condition such as joint shape, welding speed or welding posture even if an average feeding rate is the same value. Thus it is necessary to suitably change the voltage setting value according to the welding condition. However in the welding of alternating the feeding rate between a forward feeding period and a reverse feeding period, a droplet transfer state changes when the voltage setting value is changed. Thus there arises a problem that the welding state becomes unstable.

Accordingly an object of the present invention is to provide an arc welding control method which, in welding of alternating a feeding rate between a forward feeding period and a reverse feeding period, can maintain a welding state stably even if a voltage setting value changes.

Means for Solving Problems

In order to solve the above-described problem, according to the present invention, there is provided an arc welding control method of alternating a feeding rate of a welding wire between a forward feeding period and a reverse feeding period, controlling a welding voltage based on a voltage setting value and alternating short-circuiting periods and arc periods to perform welding, the arc welding control method comprising: changing a cycle of the feeding rate based on the voltage setting value.

In the arc welding control method according to the present invention, the cycle is changed to be longer when the voltage setting value becomes larger.

In the arc welding control method according to the present invention, the cycle is changed by changing a setting value of the cycle based on the voltage setting value.

In the arc welding control method according to the present invention, a smoothed value of the welding voltage is detected, and the cycle is subjected to feedback control so that the smoothed value of the welding voltage becomes equal to the voltage setting value.

In the arc welding control method according to the present invention, the cycle is changed by changing a waveform parameter of the feeding rate based on the voltage setting value.

In the arc welding control method according to the present invention, a setting value of the cycle is changed based on the voltage setting value, an average value of the cycle is detected, and the cycle is changed by performing feedback control of the waveform parameter of the feeding rate so that the average value of the cycle becomes equal to the setting value of the cycle.

In the arc welding control method according to the present invention, the waveform parameter is at least one of a forward-feeding acceleration period, a forward-feeding deceleration period, a reverse-feeding acceleration period or a reverse-feeding deceleration period.

In the arc welding control method according to the present invention, the waveform parameter is at least one of the forward-feeding acceleration period or the reverse-feeding deceleration period.

Advantageous Effects of Invention

According to the present invention, the cycle of the feeding rate is changed based on the voltage setting value. Thus the cycle of the feeding rate is optimized in correspondence to change of a droplet transfer state according to change of the voltage setting value. As a result, according to the present invention, in the welding of alternating the feeding rate between the forward feeding period and the reverse feeding period, the welding state can be maintained stably even if the voltage setting value changes.

EMBODIMENTS OF INVENTION

Hereinafter embodiments according to the present invention will be explained with reference to drawings.

First Embodiment

The invention according to the first embodiment is configured to change a cycle of a feeding rate by changing a setting value of a cycle of feeding rate based on a voltage setting value.

Figure 1:
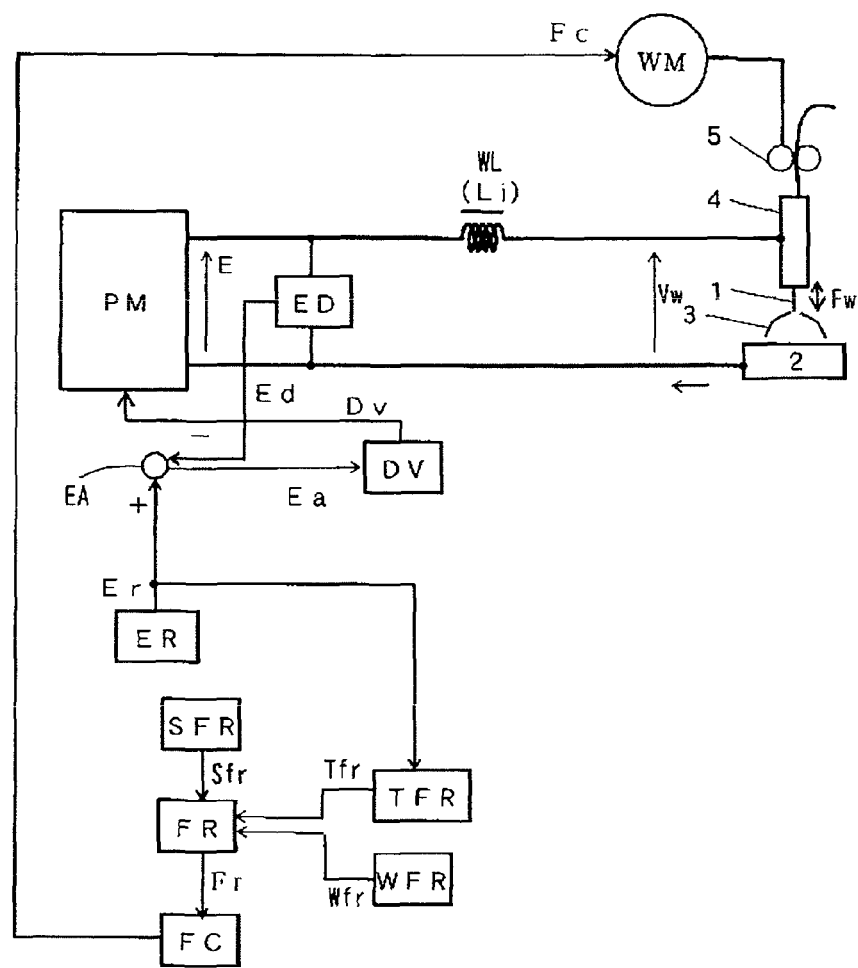
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to a drive signal Dv described later, and outputs an output voltage E. Although not shown in the figure, this power supply main circuit PM includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smoothes the output voltage E. An inductance value of the reactor WL is, for example, 200 μH.

Using a feed control signal Fc described later as input, a feeding motor WM feeds a welding wire 1 at a feeding rate Fw in a manner of alternating forward feeding periods and reverse feeding periods. A motor having high transient responsiveness is used as the feeding motor WM. In some cases, the feeding motor WM is installed near a tip of a welding torch 4 in order to increase a changing rate of the feeding rate Fw and an inversion speed of the feeding direction of the welding wire 1. Further in some cases, a push-pull feeding system is employed by using two feeding motors WM.

The welding wire 1 is fed within the welding torch 4 in accordance with rotation of a feeding roll 5 coupled to the feeding motor WM, and thus an arc 3 is generated between the welding wire and base material 2. A welding voltage Vw is applied between a power supply tip (not shown) within the welding torch 4 and the base material 2, and thus a welding current Iw flows.

A voltage setting circuit ER outputs a predetermined voltage setting signal Er. An output voltage detection circuit ED detects and smoothes the output voltage E, thereby outputting an output voltage detection signal Ed.

Using the voltage setting signal Er and the output voltage detection signal Ed as input, a voltage error amplifier circuit EA amplifies an error between the voltage setting signal Er (+) and the output voltage detection signal Ed (−) and outputs a voltage error amplified signal Ea. According to this circuit, the welding power supply is subjected to constant voltage control (output control) based on the voltage setting signal Er, and thus the welding voltage Vw is controlled.

Using the voltage error amplified signal Ea as input, a driving circuit DV performs a PWM modulation control based on the voltage error amplified signal Ea and outputs the drive signal Dv for driving the inverter circuit within the power supply main circuit PM.

Using the voltage setting signal Er as input, a cycle setting circuit TFR calculates a cycle according to a predetermined cycle setting function and outputs the calculated cycle as a cycle setting signal Tfr. This cycle setting function is a function that the larger the voltage setting signal Er is, the larger a value of the cycle setting signal Tfr becomes. The cycle setting function is set in advance by an experiment.

An amplitude setting circuit WFR outputs a predetermined amplitude setting signal Wfr. A forward-feeding side shift-amount setting circuit SFR outputs a predetermined forward-feeding side shift-amount setting signal Sfr.

Using the cycle setting signal Tfr, the amplitude setting signal Wfr and the forward-feeding side shift-amount setting signal Sfr as input, the feeding-rate setting circuit FR outputs a feeding rate pattern as a feeding-rate setting signal Fr. The feeding rate pattern is configured by shifting a sine wave, formed from the cycle determined by the cycle setting signal Tfr and the amplitude determined by the amplitude setting signal Wfr, by a forward-feeding side shift amount determined by the forward-feeding side shift-amount setting signal Sfr. A period where the feeding-rate setting signal Fr is 0 or more is the forward feeding period, whilst a period where this signal is smaller than 0 is the reverse feeding period.

Using the feeding-rate setting signal Fr as input, a feeding control circuit FC outputs, to the feeding motor WM, the feeding control signal Fc for feeding the welding wire 1 at the feeding rate Fw corresponding to a value of the feeding-rate setting signal Fr.

Figure 2:
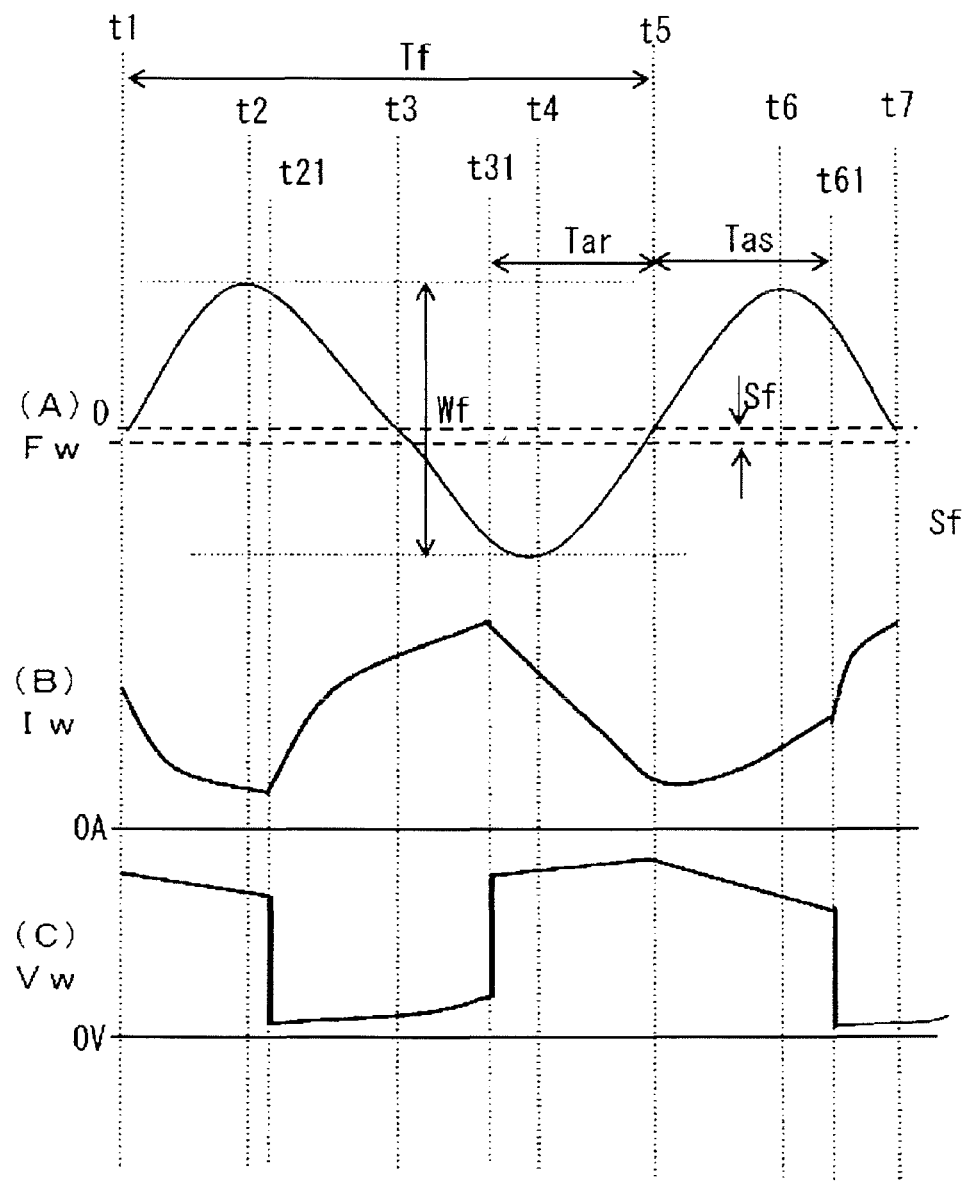
FIG. 2 A timing chart illustrating individual signals in the welding power supply of FIG. 1, showing the arc welding control method according to the first embodiment of the present invention.

FIG. 2 is a timing chart illustrating individual signals in the welding power supply of FIG. 1, showing the arc welding control method according to the first embodiment of the present invention. (A) of this figure shows temporal change of the feeding rate Fw, (B) of this figure shows temporal change of the welding current Iw, and (C) of this figure shows temporal change of the welding voltage Vw. Hereinafter explanation will be made with reference to this figure.

As shown in (A) of this figure, in the feeding rate Fw, an upper side and a lower side than 0 represent the forward feeding period and the reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoidally and shifts on the forward feeding side. Thus, as an average value of the feeding rate Fw is positive, the welding wire is fed forwardly in average. The feeding rate pattern of the feeding rate Fw may have a trapezoidal wave, a triangular wave or the like.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. Then a period from the time t5 to a time t6 is the forward feeding acceleration period again, and a period from the time t6 to a time t7 is the forward feeding deceleration period again. Thus the feeding rate Fw periodically changes according to a feeding rate pattern. This pattern is constituted of a cycle Tf (ms) from the time t1 to the time t5, an amplitude Wf (m/min) as a difference between the maximum value of the forward feeding at the time t2 and the maximum value of the reverse feeding at the time t4, and a forward-feeding side shift amount Sf (m/min). The cycle Tf is set by the cycle setting circuit TFR of FIG. 1 and changes in linkage with a value of the voltage setting signal Er. The amplitude Wf is set to a predetermined value by the amplitude setting circuit WFR of FIG. 1. The forward-feeding side shift amount Sf is set to a predetermined value by the forward-feeding side shift-amount setting circuit SFR of FIG. 1. The cycle Tf changes in linkage with the voltage setting signal Er in a range of about 8 to 20 ms. The amplitude Wf is set to about 30 to 100 m/min and the forward-feeding side shift amount Sf is set to about 3 to 20 m/min.

Short circuit between the welding wire and the base material occurs mostly before or after the maximum value of the forward feeding at the time t2. This figure shows a case where the short circuit occurs at a time t21 in the forward feeding deceleration period after the maximum value of the forward feeding. If the short circuit occurs at the time t21, the welding voltage Vw rapidly reduces to a short-circuit voltage value of a few volts as shown in (C) of this figure, whilst the welding current Iw increases gradually as shown in (B) of this figure.

As shown in (A) of this figure, from the time t3, as the feeding rate Fw is placed in the reverse feeding period, the welding wire is fed reversely. The short circuit is released by this reverse feeding, and an arc is regenerated at a time t31. The arc is regenerated mostly before or after the maximum value of the reverse feeding at the time t4. This figure shows a case where the arc is generated at the time t31 during the reverse feeding acceleration period before the maximum value of the reverse feeding. Thus a time period from the time t21 to the time t31 corresponds to the short-circuiting period.

If the arc is regenerated at the time t31, the welding voltage Vw increases rapidly to an arc voltage value of several tens of volts as shown in (C) of this figure. As shown in (B) of this figure, the welding current Iw starts changing from the maximum value state in the short-circuiting period.

As shown in (A) of this figure, during a period from the time t31 to the time t5, as the feeding rate Fw is in the reverse feeding state, the welding wire is raised and hence a length of the arc becomes longer gradually. If the arc length becomes longer, the welding voltage Vw increases, and hence the welding current Iw reduces due to the constant voltage control by the voltage error amplifier circuit EA of FIG. 1. Thus during a reverse feeding period Tar in the arc period from the time t31 to the time t5, the welding voltage Vw increases gradually as shown in (C) of this figure, whilst the welding current Iw reduces gradually as shown in (B) of this figure.

Then the next short circuit occurs at a time t61 within the forward feeding deceleration period from the time t6 to the time t7. The short circuit occurred at the time t61 is later in a time (phase) from the maximum value of the forward feeding than the short circuit occurred at the time t21. In this manner, the occurrence timing of short circuit has a certain degree of variance. A time period from the time t31 to the time t61 corresponds to the arc period. As shown in (A) of this figure, during a period from the time t5 to the time t61, as the feeding rate Fw is in the forward feeding state, the welding wire is forwardly fed and hence a length of the arc becomes shorter gradually. If the arc length becomes shorter, the welding voltage Vw reduces, and hence the welding current Iw increases due to the constant voltage control by the voltage error amplifier circuit EA of FIG. 1. Thus during a forward feeding period Tas in the arc period from the time t5 to the time t61, the welding voltage Vw reduces gradually as shown in (C) of this figure, whilst the welding current Iw increases gradually as shown in (B) of this figure.

According to the first embodiment of the present invention, as a cycle of the forward feeding and the reverse feeding as to the feeding rate can be synchronized with a cycle of the short-circuiting period and the arc period, high-quality welding result can be obtained.

As described above, a suitable value of the welding voltage Vw differs depending on the welding condition such as joint shape, welding speed or welding posture even if the average feeding rate is almost the same value. Thus it is necessary to change the voltage setting signal Er to a suitable value according to the welding condition. However as the welding voltage Vw changes if the voltage setting signal Er is changed, the droplet transfer state changes. In the welding of alternating the feeding rate Fw between the forward feeding period and the reverse feeding period, if the cycle of the feeding rate Fw is constant in a case where the droplet transfer state changes due to the change of the welding voltage Vw caused by the change of the voltage setting signal Er, the welding state becomes unstable. More specifically, when the voltage setting signal Er becomes larger, the welding state becomes unstable unless the cycle of the feeding rate Fw is made longer. In this embodiment, as the cycle of the feeding rate Fw is optimized in linkage with the change of the voltage setting signal Er, the welding state can be maintained stably.

According to the first embodiment, if the voltage setting value (voltage setting signal Er) changes, the cycle of the feeding rate is changed in linkage with the voltage setting value. Thus the cycle of the feeding rate is optimized in correspondence to change of the droplet transfer state according to change of the voltage setting value. As a result, according to the embodiment, in the welding of alternating the feeding rate between the forward feeding period and the reverse feeding period, the welding state can be maintained stably even if the voltage setting value changes.

Second Embodiment

The invention according to the second embodiment is configured to detect a smoothed value of the welding voltage and subject the cycle of the feeding rate to a feedback control so that the smoothed value of welding voltage becomes equal to the voltage setting value.

Figure 3:
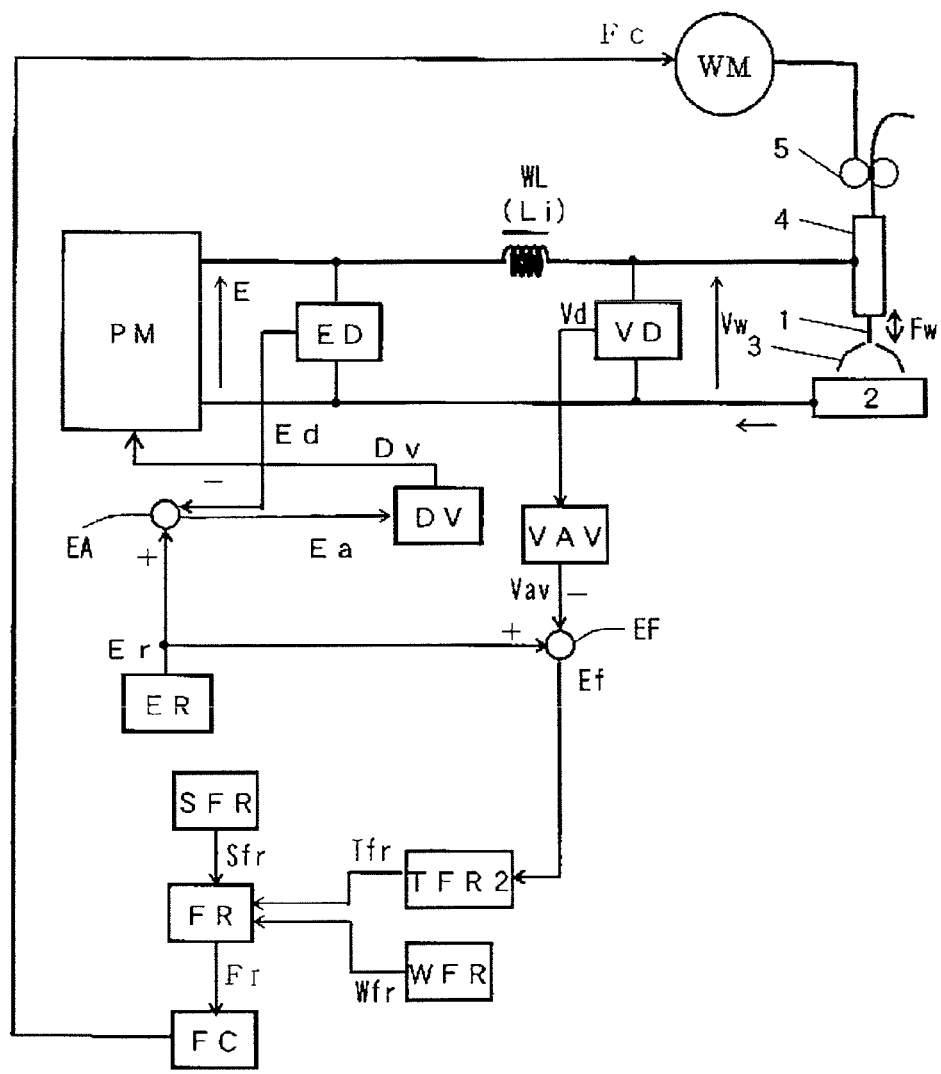
FIG. 3 A block diagram illustrating a welding power supply for implementing an arc welding control method according to a second embodiment of the present invention.

FIG. 3 is a block diagram illustrating a welding power supply for implementing an arc welding control method according to the second embodiment of the present invention. This figure corresponds to FIG. 1, and blocks identical to those of FIG. 1 are referred to by the same symbols, with explanation thereof being omitted. In this figure, a voltage detection circuit VD, a voltage smoothing circuit VAV and a feeding error amplifier circuit EF are added, and the cycle setting circuit TFR of FIG. 1 is replaced by a second cycle setting circuit TFR2. Hereinafter these individual blocks will be explained with reference to this figure.

The voltage detection circuit VD detects the welding voltage Vw and outputs a voltage detection signal Vd. Using the voltage detection signal Vd, the voltage smoothing circuit VAV smoothes this voltage detection signal and outputs a welding voltage smoothed signal Vav. This smoothing is performed using a smoothing circuit constituted of a resistor and a capacitor, a low-pass filter, and so on. In a case of using the low-pass filter, a time constant of the smoothing is determined by setting a cut-off frequency (about 1 to 10 Hz).

The feeding error amplifier circuit EF amplifies an error between the voltage setting signal Er (+) and the welding voltage smoothed signal Vav (−) and outputs a feeding error amplified signal Ef.

Using the feeding error amplified signal Ef as input, the second cycle setting circuit TFR2 integrates the feeding error amplified signal Ef during the welding and outputs a cycle setting signal Tfr. The integration can be represented as Tfr32 Tf0+∫Ef·dt. Tf0 is a predetermined initial value. According to this circuit, a value of the cycle setting signal Tfr is subjected to the feedback control and changes every moment during the welding so that a value of the welding voltage smoothed signal Vav becomes equal to a value of the voltage setting signal Er.

A timing chart of individual signals in the welding power supply of FIG. 3 illustrating the arc welding control method according to the second embodiment of the present invention is same as that of FIG. 2, and hence the explanation thereof is omitted. However this embodiment differs in a point that the cycle Tf shown in FIG. 2 is subjected to the feedback control by the feeding error amplifier circuit EF and the second cycle setting circuit TFR2 of FIG. 3 so that a value of the welding voltage smoothed signal Vav becomes equal to a value of the voltage setting signal Er.

According to the invention of the second embodiment, a smoothed value of the welding voltage is detected and the cycle of the feeding rate is subjected to the feedback control so that the welding voltage smoothed value becomes equal to the voltage setting value. Consequently the cycle of the feeding rate is subjected to the feedback control so that the welding voltage smoothed value becomes equal to the voltage setting value in correspondence to the change of the droplet transfer state according to the change of the voltage setting value. The state where the welding voltage smoothed value becomes equal to the voltage setting value is a state that a cycle of the forward feeding and the reverse feeding as to the feeding rate is not asynchronous with a cycle of the short-circuiting period and the arc period and so the welding state is stable. In the invention of the second embodiment, unlike the invention of the first embodiment, as it is not necessary to obtain the cycle setting function by an experiment in advance, efficiency of production preparation can be improved. Further, even if the voltage setting value changes under the various welding conditions, as the cycle of the feeding rate is optimized according to the feedback control, the stable welding state can be obtained always.

Third Embodiment

The invention according to a third embodiment relates to a case where a waveform of the feeding rate is trapezoidal, and is configured to change the cycle of the feeding rate by changing a waveform parameter of the feeding rate based on the voltage setting value.

Figure 4:
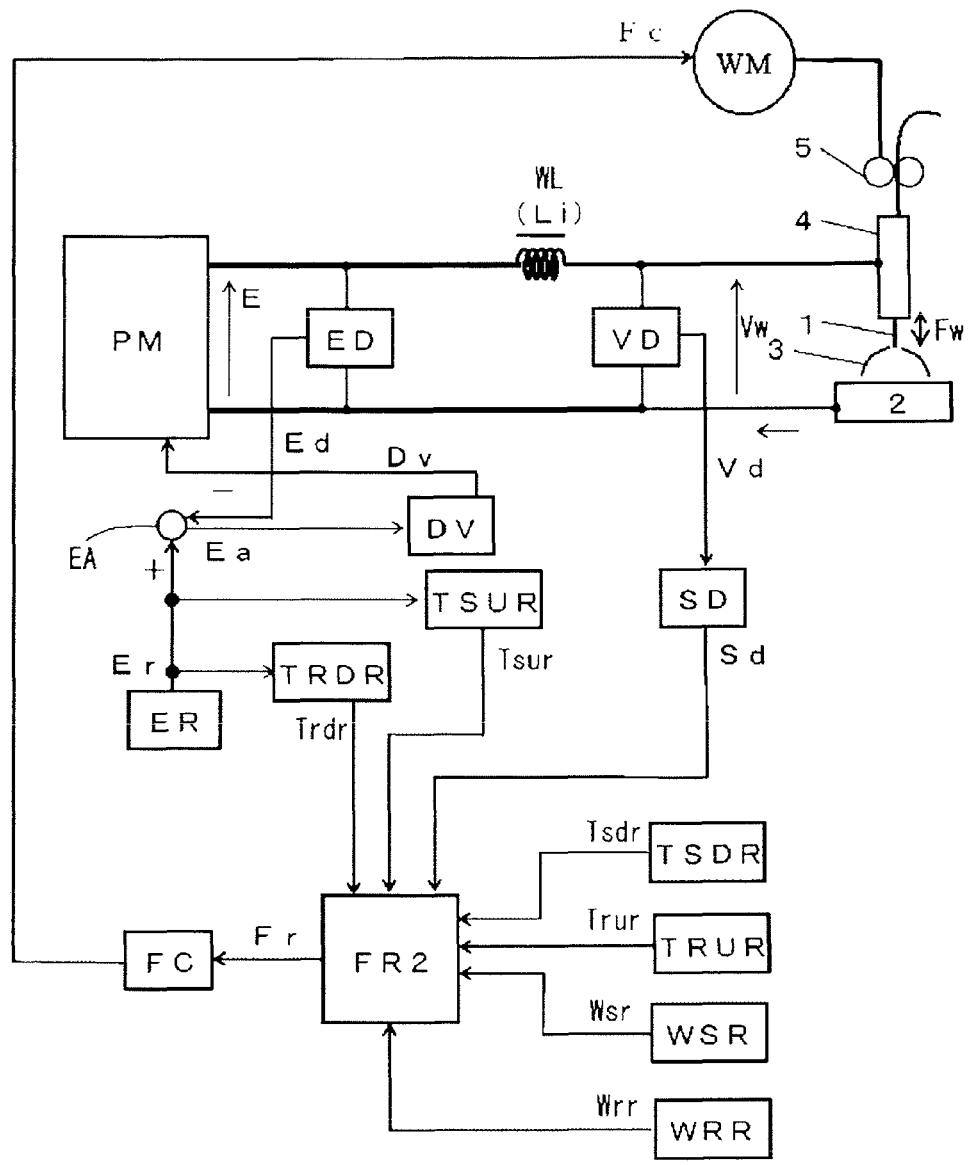
FIG. 4 A block diagram illustrating a welding power supply for implementing an arc welding control method according to a third embodiment of the present invention.

FIG. 4 is a block diagram illustrating a welding power supply for implementing an arc welding control method according to the third embodiment of the present invention. This figure corresponds to FIG. 1, and blocks identical to those of FIG. 1 are referred to by the same symbols, with explanation thereof being omitted. In this figure, the cycle setting circuit TFR, the amplitude setting circuit WFR and the forward-feeding side shift-amount setting circuit SFR of FIG. 1 are omitted. However a forward-feeding acceleration-period setting circuit TSUR, a forward-feeding deceleration-period setting circuit TSDR, a reverse-feeding acceleration-period setting circuit TRUR, a reverse-feeding deceleration-period setting circuit TRDR, a forward-feeding amplitude setting circuit WSR, a reverse-feeding amplitude setting circuit WRR, a voltage detection circuit VD and a short-circuit discrimination circuit SD are added. Further the feeding-rate setting circuit FR of FIG. 1 is replaced by a second feeding-rate setting circuit FR2. Hereinafter these individual blocks will be explained with reference to this figure.

Using the voltage setting signal Er as input, the forward-feeding acceleration-period setting circuit TSUR calculates a forward-feeding acceleration period according to a predetermined forward-feeding acceleration-period setting function and outputs the calculated period as a forward-feeding acceleration-period setting signal Tsur. The forward-feeding acceleration-period setting function is a function that the larger the voltage setting signal Er is, the larger a value of the forward-feeding acceleration-period setting signal Tsur becomes. This function is set in advance by an experiment.

The forward-feeding deceleration-period setting circuit TSDR outputs a predetermined forward-feeding deceleration-period setting signal Tsdr.

The reverse-feeding acceleration-period setting circuit TRUR outputs a predetermined reverse-feeding acceleration-period setting signal Trur.

Using the voltage setting signal Er as input, the reverse-feeding deceleration-period setting circuit TRDR calculates a reverse-feeding deceleration period according to a predetermined reverse-feeding deceleration-period setting function and outputs the calculated period as a reverse-feeding deceleration-period setting signal Trdr. The reverse-feeding deceleration-period setting function is a function that the larger the voltage setting signal Er is, the larger a value of the reverse-feeding deceleration-period setting signal Trdr becomes. This function is set in advance by an experiment.

The forward-feeding amplitude setting circuit WSR outputs a predetermined forward-feeding amplitude setting signal Wsr. The reverse-feeding amplitude setting circuit WRR outputs a predetermined reverse-feeding amplitude setting signal Wrr.

The voltage detection circuit VD detects the welding voltage Vw and outputs a voltage detection signal Vd. Using the voltage detection signal Vd as input, the short-circuit discrimination circuit SD outputs a short-circuit discrimination signal Sd. In a case where e voltage detection signal Vd is less than a short-circuit discrimination value (about 10V), the discrimination circuit determines to be a short-circuiting period and outputs the discrimination signal of a high level. In a case where the voltage detection signal is the short-circuit discrimination value or more, the discrimination circuit determines to be an arc period and outputs the discrimination signal of a low level.

Using the forward-feeding acceleration-period setting signal Tsur, the forward-feeding deceleration-period setting signal Tsdr, the reverse-feeding acceleration-period setting signal Trur, the reverse-feeding deceleration-period setting signal Trdr, the forward-feeding amplitude setting signal Wsr, the reverse-feeding amplitude setting signal Wrr and the short-circuit discrimination signal Sd as input, the second feeding-rate setting circuit FR2 generates a feeding rate pattern according to the following processing and outputs as a feeding-rate setting signal Fr. A period where the feeding-rate setting signal Fr is 0 or more is the forward feeding period, whilst a period where this signal is smaller than 0 is the reverse feeding period. 1) During a forward-feeding acceleration period Tsu determined by the forward-feeding acceleration-period setting signal Tsur, outputting the feeding-rate setting signal Fr which accelerates linearly from 0 to a forward-feeding peak value Wsp of a positive value determined by the forward-feeding amplitude setting signal Wsr. 2) Succeedingly, during a forward-feeding peak period Tsp, outputting the feeding-rate setting signal Fr which maintains the forward-feeding peak value Wsp. 3) When the short-circuit discrimination signal Sd changes to the high level (short-circuiting period) from the low level (arc period), shifting to a forward-feeding deceleration period Tsd determined by the forward-feeding deceleration-period setting signal Tsdr, and outputting the feeding-rate setting signal Fr which decelerates linearly to 0 from the forward-feeding peak value Wsp. 4) Succeedingly, during a reverse-feeding acceleration period Tru determined by the reverse-feeding acceleration-period setting signal Trur, outputting the feeding-rate setting signal Fr which accelerates linearly from 0 to a reverse-feeding peak value Wrp of a negative value determined by the reverse-feeding amplitude setting signal Wrr. 5) Succeedingly, during a reverse-feeding peak period Trp, outputting the feeding-rate setting signal Fr which maintains the reverse-feeding peak value Wrp. 6) When the short-circuit discrimination signal Sd changes to the low level (arc period) from the high level (short-circuiting period), shifting to a reverse-feeding deceleration period Trd determined by the reverse-feeding deceleration-period setting signal Trdr, and outputting the feeding-rate setting signal Fr which decelerates linearly to 0 from the reverse-feeding peak value Wrp. 7) By repeating these processing 1) to 6), the feeding-rate setting signal Fr of a feeding pattern changing in a form of a positive and a negative trapezoidal wave is generated.

Figure 5:
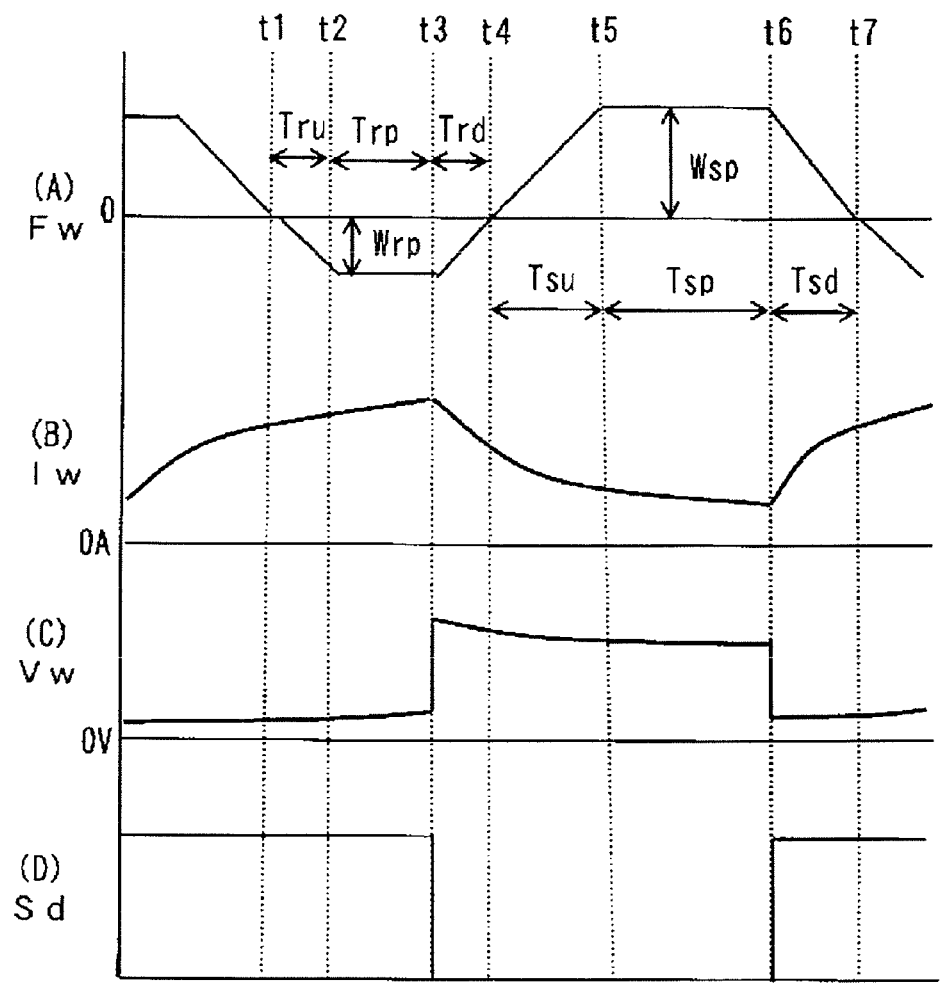
FIG. 5 A timing chart illustrating individual signals in the welding power supply of FIG. 4, showing the arc welding control method according to the third embodiment of the present invention.

FIG. 5 is a timing chart illustrating individual signals in a welding power supply of FIG. 4, showing the arc welding control method according to the third embodiment of the present invention. (A) of this figure shows temporal change of the feeding rate Fw, (B) of this figure shows temporal change of the welding current Iw, (C) of this figure shows temporal change of the welding voltage Vw, and (D) of this figure shows temporal change of the short-circuit discrimination signal Sd. Hereinafter operations of the individual signals will be explained with reference to this figure.

The feeding rate Fw shown in (A) of this figure is controlled to a value of the feeding-rate setting signal Fr outputted from the second feeding-rate setting circuit FR2 of FIG. 4. The feeding-rate setting signal Fr is formed by the forward-feeding acceleration period Tsu determined by the forward-feeding acceleration-period setting signal Tsur of FIG. 4, the forward-feeding peak period Tsp continuing until the generation of short circuit, the forward-feeding deceleration period Tsd determined by the forward-feeding deceleration-period setting signal Tsdr of FIG. 4, the reverse-feeding acceleration period Tru determined by the reverse-feeding acceleration-period setting signal Trur of FIG. 4, the reverse-feeding peak period Trp continuing until the generation of an arc, and the reverse-feeding deceleration period Trd determined by the reverse-feeding deceleration-period setting signal Trdr of FIG. 4 Further the forward-feeding peak value Wsp is determined by the forward-feeding amplitude setting signal Wsr of FIG. 4, and the reverse-feeding peak value Wrp is determined by the reverse-feeding amplitude setting signal Wrr of FIG. 4. As a result, the feeding-rate setting signal Fr has the feeding pattern changing in the form of the positive and negative trapezoidal waves.

[Operation of Reverse-Feeding Period from Time t1 to Time t4]

As shown in (A) of this figure, the feeding rate Fw enters into the predetermined reverse-feeding acceleration period Tru from a time t1 to a time t2 and accelerates from 0 to the reverse-feeding peak value Wrp. The short-circuiting period continues during this period.

When the reverse-feeding acceleration period Tru terminates at the time t2, as shown in (A) of this figure, the feeding rate Fw enters into the reverse-feeding peak period Trp and reaches the reverse-feeding peak value Wrp. The short-circuiting period also continues during this period.

When an arc is generated at a time t3, as shown in (D) of this figure, the short-circuit discrimination signal Sd changes to the low level (arc period). In response to this change, the feeding-rate setting signal shifts to the predetermined reverse-feeding deceleration period Trd of the time t3 to a time t4. Thus as shown in (A) of this figure, the feeding rate Fw decelerates from the reverse-feeding peak value Wrp to 0. Simultaneously, the welding voltage Vw rapidly increases to the arc voltage value of several tens of volts as shown in (C) of this figure, whilst the welding current Iw gradually reduces during the arc period as shown in (B) of this figure.

[Operation of Forward-Feeding Period from Time t4 to Time t7]

When the reverse-feeding deceleration period Trd terminates at the time t4, the feeding-rate setting signal shifts to the predetermined forward-feeding acceleration period Tsu of the time t4 to a time t5. During the forward-feeding acceleration period Tsu, the feeding rate Fw accelerates from 0 to the forward-feeding peak value Wsp as shown in (A) of this figure. The arc period continues during this period.

When the forward-feeding acceleration period Tsu terminates at the time t5, as shown in (A) of this figure, the feeding rate Fw enters into the forward-feeding peak period Tsp and reaches the forward-feeding peak value Wsp. The arc period also continues during this period.

When short circuit occurs at a time t6, as shown in (D) of this figure, the short-circuit discrimination signal Sd changes to the high level (short-circuiting period). In response to this change, the feeding-rate setting signal shifts to the predetermined forward-feeding deceleration period Tsd of the time t6 to a time t7. Thus as shown in (A) of this figure, the feeding rate Fw decelerates from the forward-feeding peak value Wsp to 0. Simultaneously, the welding voltage Vw rapidly reduces to the short-circuit voltage value of a few volts as shown in (C) of this figure, whilst the welding current Iw increases gradually during the short-circuiting period as shown in (B) of this figure.

As described above, in the welding of alternating the feeding rate Fw between the forward feeding period and the reverse feeding period, if the cycle of the feeding rate Fw is almost constant in the case where the droplet transfer state changes due to the change of the welding voltage Vw caused by the change of the voltage setting signal Er, the welding state becomes unstable. In the third embodiment, as the forward-feeding peak period Tsp and the reverse-feeding peak period Tip terminate in synchronous with the occurrence of short circuit and the generation of arc, respectively, these peak periods are not constant. Thus the cycle of the feeding rate Fw cannot be directly set to a predetermined value. However an average value of the forward-feeding peak period Tsp and an average value of the reverse-feeding peak period Trp at every unit time (0.1 to 1 second) become almost respective constant values. Thus an average value of the cycle of the feeding rate Fw at every unit time can be set to a desired value by adjusting at least one of the forward-feeding acceleration period Tsu, the forward-feeding deceleration period Tsd, the reverse-feeding acceleration period Tru or the reverse-feeding deceleration period Trd each of which is the individual waveform parameter of the feeding rate Fw and can be set to an individual desired value. Thus in the third embodiment, an average value of the cycle of the feeding rate Fw at every unit time can be optimized by changing at least one of the forward-feeding acceleration period Tsu, the forward-feeding deceleration period Tsd, the reverse-feeding acceleration period Tru or the reverse-feeding deceleration period Trd in linkage with the voltage setting signal Er. Consequently the welding state can be maintained stably even if the voltage setting signal Er changes.

FIG. 4 shows an example where the forward-feeding acceleration period Tsu and the reverse-feeding deceleration period Trd as the waveform parameters of the feeding rate Fw are automatically changed according to predetermined respective functions in linkage with the voltage setting signal Er, A forward-feeding acceleration-period setting function and a reverse-feeding deceleration-period setting function are defined in the following manner in advance. An average value of the cycle of the feeding rate Fw stabilizing the welding state is obtained by an experiment at every value of the voltage setting signal Er. Both values of the forward-feeding acceleration period Tsu and the reverse-feeding deceleration period Trd are determined so as to attain the obtained average value of the cycle. The individual functions are defined from these determined values. Also in a case where the waveform parameters of the feeding rate Fw are a combination of other periods, functions can be defined in the similar manner.

Of the waveform parameters of the feeding rate Fw, if the forward-feeding deceleration period Tsd and the reverse-feeding acceleration period Tru during the short-circuiting period are set to predetermined values, and if at least one of the forward-feeding acceleration period Tsu or the reverse-feeding deceleration period Trd during the arc period is optimized in linkage with the voltage setting signal Er, the welding state can be more stabilized.

Fourth Embodiment

The invention according to a fourth embodiment is configured to, in the third embodiment, change a setting value of the cycle of the feeding rate based on the voltage setting value, detect an average value of the cycle of the feeding rate, and subject the waveform parameters of the feeding rate to feedback control so that this average value of the cycle becomes equal to the setting value of the cycle.

Figure 6:
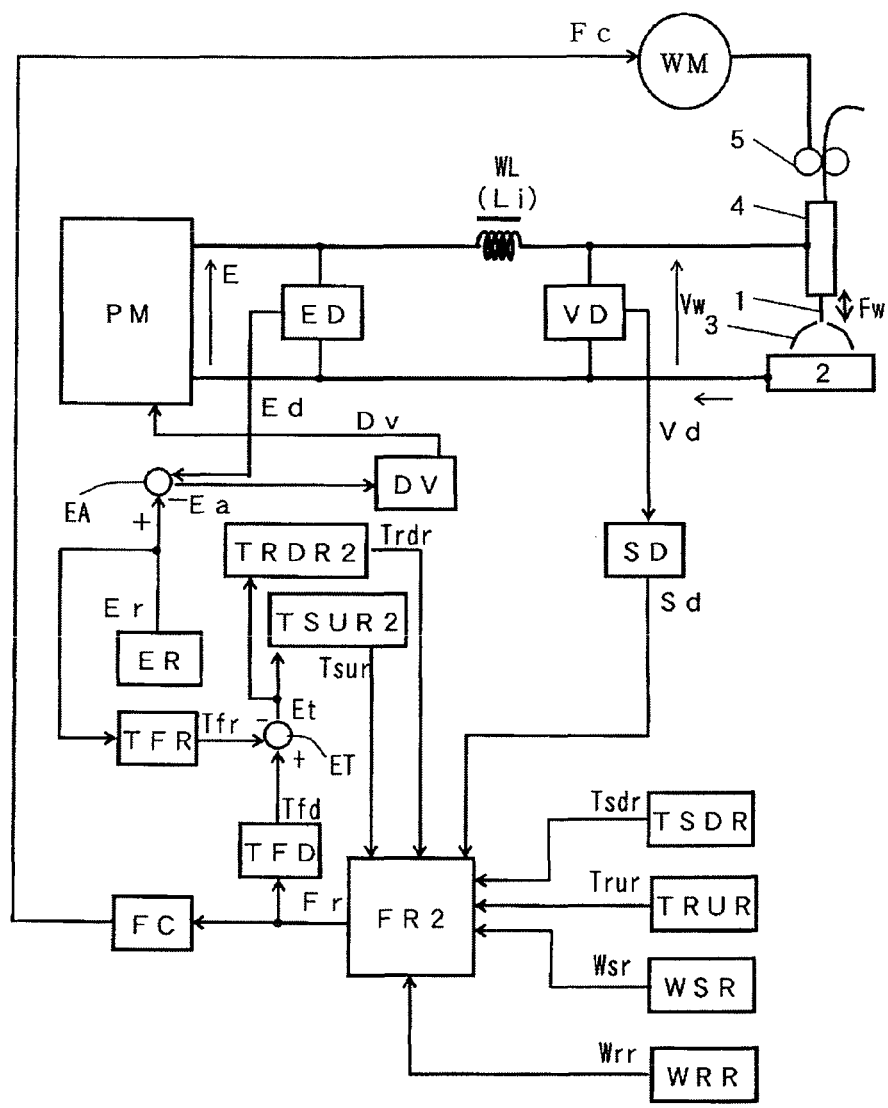
FIG. 6 A block diagram illustrating a welding power supply for implementing an arc welding control method according to a fourth embodiment of the present invention.

FIG. 6 is a block diagram illustrating a welding power supply for implementing an arc welding control method according to the fourth embodiment of the present invention. This figure corresponds to FIG. 4, and blocks identical to those of FIG. 4 are referred to by the same symbols, with explanation thereof being omitted. In this figure, a cycle setting circuit TFR same as that of FIG. 1 is added, and further a cycle average value detection circuit TFD, a cycle error amplifier circuit ET, a second forward-feeding acceleration-period setting circuit TSUR2 and a second reverse-feeding deceleration-period setting circuit TRDR2 are added. Hereinafter these individual blocks will be explained with reference to this figure.

Using the voltage setting signal Er as input, the cycle setting circuit TFR calculates a cycle according to a predetermined cycle setting function and outputs the calculated cycle as a cycle setting signal Tfr. This circuit is the same as that of FIG. 1.

Using the feeding-rate setting signal Fr as input, the cycle average value detection circuit TFD detects an average value of a cycle of the feeding-rate setting signal Fr per unit time and outputs a cycle average value detection signal Tfd.

The cycle error amplifier circuit ET amplifiers an error between the cycle setting signal Tfr (−) and the cycle average value detection signal Tfd (+) and outputs a cycle error amplified signal Et.

Using the cycle error amplified signal Et as input, the second forward-feeding acceleration-period setting circuit TSUR2 integrates the cycle error amplified signal Et during the welding and outputs a forward-feeding acceleration-period setting signal Tsur. The integration can be represented as Tsur=Tsu0+∫Et·dt. Tsu0 is a predetermined initial value. According to this circuit, a value of the forward-feeding acceleration-period setting signal Tsur is subjected to the feedback control and changes every moment during the welding so that an average value of the cycle of the feeding rate Fw becomes equal to a value of the cycle setting signal Tfr.

Using the cycle error amplified signal Et as input, the second reverse-feeding deceleration-period setting circuit TRDR2 integrates the cycle error amplified signal Et during the welding and outputs a reverse-feeding deceleration-period setting signal Trdr. The integration can be represented as Trdr=Trd0+∫Et·dt. Trd0 is a predetermined initial value. According to this circuit, a value of the reverse-feeding deceleration-period setting signal Trdr is subjected to the feedback control and changes every moment during the welding so that an average value of the cycle of the feeding rate Fw becomes equal to a value of the cycle setting signal Tfr.

A timing chart of individual signals in a welding power supply of FIG. 6 illustrating the arc welding control method according to the fourth embodiment of the present invention is same as that of FIG. 5, and hence the explanation thereof is omitted. However this embodiment differs in a point that the forward-feeding acceleration period Tsu and the reverse-feeding deceleration period Trd shown in FIG. 5 are subjected to the feedback control by the second forward-feeding acceleration-period setting circuit TSUR2 and the second reverse-feeding deceleration-period setting circuit TRDR2 respectively so that an average value of the cycle of the feeding rate Fw becomes equal to a value of the cycle setting signal Tfr.

The fourth embodiment is explained as to the case where the waveform parameters of the feeding rate Fw are the forward-feeding acceleration period Tsu and the reverse-feeding deceleration period Trd. The waveform parameter of the feeding rate Fw may be at least one of the forward-feeding acceleration period Tsu, the forward-feeding deceleration period Tsd, the reverse-feeding acceleration period Tru or the reverse-feeding deceleration period Trd.

According to the fourth embodiment described above, in the third embodiment, the waveform parameters of the feeding rate are subjected to the feedback control so that an average value of the cycle of the feeding rate becomes equal to the cycle setting value. Thus as an average value of the cycle of the feeding rate becomes strictly equal to the cycle setting value, stability of the welding state at the time of change of the voltage setting value can be improved.

INDUSTRIAL APPLICABILITY

The present invention can provide the arc welding control method which, in the welding of alternating the feeding rate between the forward feeding period and the reverse feeding period, can maintain the welding state stably even if the voltage setting value changes.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-165785) filed on Aug. 18, 2014, the content of which is incorporated herein by reference.

DESCRIPTION OF REFERENCE NUMERALS 1 welding wire
2 base material
3 arc
4 welding torch
5 feeding roll
DV driving circuit
Dv drive signal
E output voltage
EA voltage error amplifier circuit
Ea voltage error amplified signal
ED output voltage detection circuit
Ed output voltage detection signal
EF feeding error amplifier circuit
Ef feeding error amplified signal
ER voltage setting circuit
Er voltage setting signal
ET cycle error amplifier circuit
Et cycle error amplified signal
FC feeding control circuit
Fc feeding control signal
FR feeding-rate setting circuit
Fr feeding-rate setting signal
FR2 second feeding-rate setting circuit
Fw feeding rate
Iw welding current
PM power supply main circuit
SD short-circuit discrimination circuit
Sd short-circuit discrimination signal
Sf forward-feeding side shift amount
SFR forward-feeding side shift-amount setting circuit
Sfr forward-feeding side shift-amount setting signal
Tar arc period reverse feeding period
Tas arc period forward feeding period
Tf cycle of feeding rate
TFD cycle average value detection circuit
Tfd cycle average value detection signal
TFR cycle setting circuit
Tfr cycle setting signal
TFR2 second cycle setting circuit
Trd reverse-feeding deceleration period
TRDR reverse-feeding deceleration-period setting circuit
Trdr reverse-feeding deceleration-period setting signal
TRDR2 second reverse-feeding deceleration-period setting circuit
Trp reverse-feeding peak period Tru reverse-feeding acceleration period
TRUR reverse-feeding acceleration-period setting circuit
Trur reverse-feeding acceleration-period setting signal
Tsd forward-feeding deceleration period
TSDR forward-feeding deceleration-period setting circuit
Tsdr forward-feeding deceleration-period setting signal
Tsp forward-feeding peak period
Tsu forward-feeding acceleration period
TSUR forward-feeding acceleration-period setting circuit
Tsur forward-feeding acceleration-period setting signal
TSUR2 second forward-feeding acceleration-period setting circuit
VAV voltage smoothing circuit
Vav welding voltage smoothed signal
VD voltage detection circuit
Vd voltage detection signal
Vw welding voltage
Wf amplitude
WFR amplitude setting circuit
Wfr amplitude setting signal
WL reactor
WM feeding motor
Wrp reverse-feeding peak value
WRR reverse-feeding amplitude setting circuit
Wrr reverse-feeding amplitude setting signal
Wsp forward-feeding peak value
WSR forward-feeding amplitude setting circuit
Wsr forward-feeding amplitude setting signal

The invention claimed is:

1. An arc welding control method of alternating a feeding rate of a welding wire between a forward feeding period and a reverse feeding period, controlling a welding voltage based on a voltage setting value and alternating short-circuiting periods and arc periods to perform welding, the arc welding control method comprising: changing a cycle of the feeding rate based on the voltage setting value which is variable and when the voltage setting value changes, changing the cycle of the feeding rate in linkage with the changed voltage setting value.

2. The arc welding control method according to claim 1, wherein the cycle is changed to be longer when the voltage setting value becomes larger.

3. The arc welding control method according to claim 1, wherein the cycle is changed by changing a setting value of the cycle based on the voltage setting value.

4. The arc welding control method according to claim 1, wherein a smoothed value of the welding voltage is detected, and the cycle is subjected to feedback control so that the smoothed value of the welding voltage becomes equal to the voltage setting value.

5. The arc welding control method according to claim 1, wherein the cycle is changed by changing a waveform parameter of the feeding rate based on the voltage setting value.

6. The arc welding control method according to claim 1, wherein a setting value of the cycle is changed based on the voltage setting value, an average value of the cycle is detected, and the cycle is changed by performing feedback control of a waveform parameter of the feeding rate so that the average value of the cycle becomes equal to the setting value of the cycle.

7. The arc welding control method according to claim 5, wherein the waveform parameter is at least one of a forward-feeding acceleration period, a forward-feeding deceleration period, a reverse-feeding acceleration period or a reverse-feeding deceleration period.

8. The arc welding control method according to claim 5, wherein the waveform parameter is at least one of a forward-feeding acceleration period or a reverse-feeding deceleration period.

9. The arc welding control method according to claim 6, wherein the waveform parameter is at least one of a forward-feeding acceleration period, a forward-feeding deceleration period, a reverse-feeding acceleration period or a reverse-feeding deceleration period.

10. The arc welding control method according to claim 6, wherein the waveform parameter is at least one of a forward-feeding acceleration period or a reverse-feeding deceleration period.

* * * * *